Patented Oct. 31, 1950

2,527,597

UNITED STATES PATENT OFFICE 2,527,597

ESTERS OF OLEIC ACID WITH UNSATURATED ALCOHOLS

Daniel Swern, Philadelphia, and Geraldine B. Dickel, Monongahela, Pa., assignors to United States of America as represented by the Secretary of Agriculture No Drawing. Application July 22, 1947, Serial No. 762,783

3 Claims. (Cl. 260—23.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to plastic compositions and methods of preparing them and is more particularly concerned with plastic compositions comprising long chain constituents derived from oleaginous substances.

Many long chain compounds derived from fats and oils possess properties that render them useful as softeners and plasticizing agents. Utilization of such compounds in the production of plastic compositions is often limited, however, by their low compatibility with many high molecular substances and their tendency to exude from admixtures with such products, thereby imparting an undesirable "greasy feel" to the plasticized material. These inherent disadvantages of long chain modifiers and plasticizing agents can be obviated by the production of compositions wherein the plasticizing or modifying agent is chemically bound in the polymer molecule by copolymerizing the long chain material with a reactive monomer. Heretofore, the main difficulty in making the fatty compounds an integral part of the polymer molecule by a copolymerization process has been the lack of suitable fat or oil derivatives containing the necessary functional groups. We have found that polymerizable esters of long chain, monounsaturated aliphatic acids, containing an olefinic linkage, with unsaturated alcohols can be copolymerized with polymerizable olefinic monomers.

In accordance with the method of this invention a mixture of monomers comprising an ester of the aforementioned type and an active olefinic monomer is polymerized by any suitable means such as heat, light and/or catalyst. Preferably, polymerization is effected by heating the monomer mixture at a temperature of about 40° to 100° C. in the presence of a polymerization catalyst or initiator, such as an organic peroxide like benzoyl, lauroyl, or stearoyl peroxide; a persulfate like ammonium persulfate or other similar compounds commonly utilized as catalytic agents in the production of high molecular polymers.

The polymerization process can be conducted either by bulk polymerization of the monomer mixture or in emulsion, or in the presence of inert solvents or diluents. The method is applicable to esters of long chain monounsaturated aliphatic acids containing one olefinic linkage, such as oleic and iso-oleic acids, elaidic, undecylenic, ricinoleic, alpha-beta nonenoic, petroselinic, erucic, and brassidic acid, with unsaturated alcohols containing an ethylenic linkage, such as vinyl, allyl, crotonyl, chloroallyl, methallyl, and oleyl alcohols. These esters can be copolymerized with various active olefinic monomers such as vinyl compounds like vinyl acetate and vinyl chloride, unsaturated phthalates such as diallylphthalate, acrylonitrile, derivatives of maleic acid anhydride, isobutylene, isoprene, styrene, butadiene, and the like.

The properties of the copolymerized products thus obtained depend on the nature and proportions of the co-monomers present in the mixture and the conditions of polymerization. Polymers can also be obtained from the esters of oleic acid without the addition of active olefinic monomers. Such polymerizations can be effected by means of heat, light and/or catalysts, such as peroxides.

The following examples are illustrative of the invention:

Example 1

*Preparation of 2-chloroallyl oleate.*—Oleic acid (70.6 grams, 0.25 mole), 2-chloroallyl alcohol (46.2 grams, 0.50 mole), naphthalene-$\beta$-sulfonic acid (0.71 gram), and 250 ml. of benzene were refluxed for about five hours. The water formed during the reaction was removed as the benzene-water azeotrope and the benzene was returned to the reaction mixture. Approximately the theoretical quantity of water was formed (4.3 ml.). Sodium bicarbonate was then added to the reaction mixture to neutralize the catalyst and the benzene and excess 2-chloroallyl alcohol were recovered. The residue of crude 2-chloroallyl oleate was distilled through a forty-five cm. Vigreux column in an atmosphere of nitrogen yielding 85 grams of fairly pure 2-chloroallyl oleate, B. P. 206–214° C. at 4.5 mm. of mercury. Redistillation yielded 70 grams of pure 2-chloroallyl oleate, B. P. 216° C. at 5 mm. of mercury; $d_4^{30}$ 0.9318, $n_D^{30}$ (Abbe) 1.4627. Molecular refraction: calculated, 104.8; found, 105.5. Carbon (percent): calculated 70.7; found, 71.1. Hydrogen (per cent): calculated, 10.4; found, 9.3. Chlorine (per cent): calculated, 9.93; found, 10.1.

EXAMPLE 2

*Preparation of methallyl (2-methylallyl) oleate.*—Metallic sodium (0.89 gram) was dissolved in 216 grams (3.0 moles) of methallyl alcohol.

Methyl oleate (89 grams; 0.3 mole) was added and the solution heated for three hours at 95–100° C. in an atmosphere of nitrogen with occasional shaking. The unreacted methallyl alcohol was recovered by distillation. The residue of crude methallyl oleate was distilled as described above yielding 75 grams of fairly pure methallyl oleate, B. P. 193–206° C. at 4.3 mm. of mercury. Redistillation yielded 67 grams of pure methallyl oleate, B. P. 203–5° C. at 4.3 mm. of mercury; $d_4^{30}$ 0.8679, $n_D^{30}$ (Abbe) 1.4546. Molecular refraction: calculated, 104.5; found, 105.1. Saponification number: calculated, 166.8; found, 168.0. Iodine number: calculated, 150.7; found, 149.5. Carbon (percent): calculated, 78.6; found, 79.2. Hydrogen (percent): calculated, 12.0; found, 11.5.

EXAMPLE 3

*Preparation of crotyl oleate.*—In accordance with the procedure of Example 2, crotyl oleate was prepared from crotyl alcohol (216 grams), in which 0.45 gram of metallic sodium had been dissolved, and methyl oleate (89 grams). About 90 grams of fairly pure crotyl oleate, B. P. 200–207° C. at 3 mm. of mercury were obtained. Redistillation yielded 80 grams of pure crotyl oleate, B. P. 203° C. at 3.5 mm. of mercury; $d_4^{30}$ 0.8693; $n_D^{30}$ (Abbe) 1.4556. Molecular refraction: calculated, 104.5; found, 105.0. Saponification number: calculated, 166.8; found, 167.6. Iodine number: calculated, 150.7; found, 149.9. Carbon (percent): calculated, 78.6; found, 78.5. Hydrogen (percent): calculated, 12.0; found, 12.4.

EXAMPLE 4

*Preparation of 1-buten-3-yl (1-methylallyl) oleate.*—In accordance with the procedure of Example 2, 1-buten-3-yl oleate was prepared from 1-buten-3-ol (216 grams), in which 0.45 gram of metallic sodium had been dissolved, and methyl oleate (89 grams). About 90 grams of fairly pure 1-buten-3-yl oleate, B. P. 180–185° C. at 2.2 mm. of mercury were obtained. Redistillation yielded 77 grams of pure 1-buten-3-yl oleate, B. P. 193–194° C. at 3.5 mm. of mercury; $d_4^{30}$ 0.8628; $n_D^{30}$ (Abbe) 1.4504. Molecular refraction: calculated, 104.5; found, 104.8. Saponification number: calculated, 166.8; found, 168.3. Iodine number: calculated, 150.7; found, 151.4. Carbon (percent): calculated, 78.6; found, 78.2. Hydrogen (percent): calculated, 12.0; found, 12.0.

EXAMPLE 5

Samples of various esters of oleic acid with unsaturated alcohols were heated at about 100° C. in the presence of benzoyl peroxide as a polymerization catalyst (1% by weight). The refractive indexes of these samples were determined at regular intervals of time. The data so obtained which show the progress of the polymerization reaction are given in the following table:

*Table A*

| Duration of heating in hrs | 0 | 10 | 24 |
|---|---|---|---|
| Oleic Acid Ester | Refractive Index ($n_D^{30}$ Abbé) | | |
| Vinyl oleate | 1.4533 | 1.462 | 1.463 |
| Allyl oleate | 1.4539 | 1.458 | 1.458 |
| 1-Methallyl oleate | 1.4504 | 1.453 | 1.453 |
| 2-Methallyl oleate | 1.4546 | 1.458 | 1.458 |
| Crotyl oleate | 1.4556 | 1.457 | 1.457 |
| Oleyl oleate | 1.4605 | 1.462 | 1.462 |
| Furfuryl oleate | 1.4681 | 1.469 | 1.469 |
| 2-Chloroallyl oleate | 1.4627 | 1.473 | 1.473 |

As shown in the foregoing table, vinyl- and 2-chloroallyl oleates polymerize at a much more rapid rate than any of the other esters yielding viscous oils insoluble in acetone and glacial acetic acid. In the very early stages of the polymerization these two esters yield partially polymerized high boiling products which are readily soluble in organic solvents and are useful as plasticizers and modifiers for high polymeric materials. Polymerization of the other esters listed in the table takes place more slowly and yields organic-solvent-soluble products which are also useful as plasticizing agents and modifiers.

Similar results are obtained by conducting the polymerization in the presence of other catalysts, such as various organic peroxides, and at temperatures within the range of about 40° to 100° C., the rate of polymerization increasing with the temperature. The following table sets forth the composition and properties of the products obtained by copolymerizing freshly distilled vinyl acetate and various esters of oleic acid with 0.5% benzoyl peroxide as catalyst by the procedure described by Guile & Huston, A Revised Laboratory Manual of Synthetic Plastics and Resinous Materials, p. 99, Michigan State College, 1944:

*Table B*

| Monomer Mixture | | Solubility [1] | Physical Appearance |
|---|---|---|---|
| Vinyl Acetate, Per Cent | Vinyl Oleate, Per Cent | | |
| 100 | 0 | S | Hard, glass-like colorless. |
| 99 | 1 | I | Tough, hard, colorless. |
| 91 | 9 | I | Tough, pliable, colorless. |
| 80 | 20 | I | Tough, soft, colorless. |
| 70 | 30 | I | Soft, elastic, colorless. |
| 60 | 40 | S | Viscous liquid, colorless. |
| | 2-Chloroallyl oleate | | |
| 99 | 1 | I | Tough, hard, colorless. |
| 91 | 9 | I | Tough, hard, colorless. |
| 80 | 20 | I | Tough, pliable, colorless. |
| 70 | 30 | I | Tough, pliable, colorless. |
| 60 | 40 | I | Tough, soft, colorless. |
| | Methallyl oleate | | |
| 99 | 1 | I | Hard, glass-like, colorless. |
| 91 | 9 | I | Tough, hard, colorless. |
| 80 | 20 | I | Tough, soft, colorless. |
| 70 | 30 | I | Soft, elastic, colorless. |
| 60 | 40 | S | Slightly viscous liquid, colorless. |
| | Allyl oleate | | |
| 99 | 1 | I | Tough, hard, colorless. |
| 91 | 9 | I | Tough, soft, colorless. |
| 80 | 20 | I | Very soft, elastic, colorless. |
| 70 | 30 | S | Viscous liquid, colorless. |
| 60 | 40 | S | Viscous liquid, colorless. |
| | 1-Buten-3-yl oleate | | |
| 99 | 1 | I | Hard, glass-like, colorless. |
| 91 | 9 | I | Tough, pliable, colorless. |
| 80 | 20 | I | Soft, elastic, colorless. |
| 70 | 30 | S | Very soft, elastic, colorless. |
| 60 | 40 | S | Viscous liquid, colorless. |
| | Crotyl oleate | | |
| 99 | 1 | S | Hard, glass-like, colorless. |
| 91 | 9 | S | Soft, elastic, colorless. |
| 80 | 20 | S | Very soft, elastic colorless. |
| | Furfuryl oleate | | |
| 99 | 1 | S | Hard, glass-like, straw yellow. |
| 91 | 9 | S | Hard, glass-like, straw yellow. |
| 80 | 20 | S | Viscous liquid, light brown. |
| 70 | 30 | S | Viscous liquid, light brown. |
| 60 | 40 | S | Viscous liquid, light brown. |
| | Oleyl oleate | | |
| 99 | 1 | S | Hard, glass-like, colorless. |

[1] S=soluble in acetone, amyl acetate and acetic acid at room temperature. I=insoluble in boiling acetone, and in amyl acetate and acetic acid at 100°.

Products having similar properties are also obtained when other polymerizable olefinic monomers, such as those mentioned heretofore, are used in place of vinyl acetate in the foregoing example, and on substituting other organic peroxides or similar compounds such as persulfates for the benzoyl peroxide. The polymerizaton can also be effected at any temperature within the range of about 40° to 100° C., the rate of polymerization increasing with the temperature. The term polymeric 2-chloroallyl oleate means polymers and copolymers thereof.

Having thus described our invention, we claim:

1. A copolymer of a mixture the polymerizable constituents of which mixture essentially consist of vinyl acetate and monomeric 2-chlorallyl oleate, the latter ranging from above 30 to about 40 percent of the total weight of the acetate and oleate, the copolymer being characterized by insolubility in boiling acetone and in amyl acetate and acetic acid at 100° C.

2. A process comprising copolymerising 2-chloroallyl oleate with vinyl acetate by heating a mixture of the two in the presence of benzoyl peroxide at 40° to 100° C., the oleate ranging from above 30 to about 40 percent of the total weight of acetate and oleate, to yield a tough, pliable to soft, copolymer insoluble in boiling acetone, and in amyl acetate and acetic acid at 100° C.

3. A copolymer of a mixture the polymerizable constituents of which essentially consist of 60 percent vinyl acetate and about 40 percent monomeric 2-chloroallyl oleate, being insoluble in boiling acetone and in amyl acetate and acetic acid at 100° C.

DANIEL SWERN.
GERALDINE B. DICKEL.

REFERENCES CITED

The following references are of record in the file of this patent:

UNITED STATES PATENTS

| Number | Name | Date |
|---|---|---|
| 2,118,864 | Reppe et al. | May 31, 1938 |
| 2,127,660 | Coleman et al. | Aug. 23, 1938 |
| 2,273,891 | Pollack et al. | Feb. 24, 1942 |
| 2,374,081 | Dean | Apr. 17, 1945 |
| 2,378,827 | Bradley | June 19, 1945 |
| 2,426,913 | Adelson | Sept. 2, 1947 |
| 2,476,936 | Whetstone | July 19, 1949 |